(12) United States Patent
Silberman-Sais et al.

(10) Patent No.: US 12,309,436 B2
(45) Date of Patent: May 20, 2025

(54) SYSTEM AND METHOD FOR HOSTING LIVE MULTICASTING SESSIONS

(71) Applicant: Bandits Roost LLC, New York, NY (US)

(72) Inventors: Cori Silberman-Sais, New York, NY (US); Michael Sais, New York, NY (US)

(73) Assignee: Bandits Roost LLC, New York, NY (US)

( * ) Notice: Subject to any disclaimer, the term of this patent is extended or adjusted under 35 U.S.C. 154(b) by 70 days.

(21) Appl. No.: 17/527,369

(22) Filed: Nov. 16, 2021

(65) Prior Publication Data

US 2022/0159314 A1    May 19, 2022

Related U.S. Application Data

(60) Provisional application No. 63/114,056, filed on Nov. 16, 2020.

(51) Int. Cl.
*H04N 21/2187* (2011.01)
*H04N 21/475* (2011.01)
*H04N 21/4784* (2011.01)
*H04N 21/6405* (2011.01)
*H04N 21/854* (2011.01)

(52) U.S. Cl.
CPC ..... *H04N 21/2187* (2013.01); *H04N 21/4758* (2013.01); *H04N 21/4784* (2013.01); *H04N 21/6405* (2013.01); *H04N 21/854* (2013.01)

(58) Field of Classification Search
CPC ........... H04N 21/2187; H04N 21/4758; H04N 21/4784; H04N 21/6405; H04N 21/854; H04N 21/8545
See application file for complete search history.

(56) References Cited

U.S. PATENT DOCUMENTS

| | | | |
|---|---|---|---|
| 2013/0053115 A1* | 2/2013 | Hu | H04L 67/131 463/9 |
| 2013/0174055 A1* | 7/2013 | Johnson | H04N 21/4758 715/753 |
| 2016/0078705 A1* | 3/2016 | Lin | G06Q 10/10 705/12 |
| 2017/0001111 A1* | 1/2017 | Willette | A63F 13/49 |

(Continued)

FOREIGN PATENT DOCUMENTS

WO    WO-2019236751 A1 * 12/2019

*Primary Examiner* — Ngoc K Vu
(74) *Attorney, Agent, or Firm* — Meister Seelig & Fein PLLC

(57) ABSTRACT

A system for hosting a live multicast session, the system comprising a processor and a memory having executable instructions stored thereon that when executed by the processor cause the processor to establish a live multicast session initiated by a multicasting user of a multicasting client device wherein the live multicast session transmits a live media stream to viewer client devices of viewer users. The processor is further configured to receive an indication of a voting event from the multicasting user during the live multicast session, generate choices based on input from the multicasting user, present the choices to the viewer client devices, receive votes on the choices from the viewer client devices, calculate a result of the votes, and reward the viewer users based on the result of the votes.

24 Claims, 4 Drawing Sheets

(56) References Cited

U.S. PATENT DOCUMENTS

| | | | |
|---|---|---|---|
| 2018/0160180 A1* | 6/2018 | Kedenburg, III | H04N 21/4753 |
| 2018/0183844 A1* | 6/2018 | Danker | H04N 21/4756 |
| 2019/0099653 A1* | 4/2019 | Wanke | G06Q 50/01 |
| 2022/0150551 A1* | 5/2022 | Mizuta | G06T 7/223 |

* cited by examiner

SYSTEM AND METHOD FOR HOSTING LIVE MULTICASTING SESSIONS

CROSS REFERENCE TO RELATED APPLICATION

This application claims the priority of U.S. Provisional Application No. 63/114,056, entitled "SYSTEM AND METHOD FOR HOSTING LIVE MULTICASTING SESSIONS," filed on Nov. 16, 2020, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to live streaming on a social media platform, and in particular, creating live voting engagements for viewers to make decisions on a streaming users' behalf.

Description of the Related Art

Social media, in addition to celebrity viewing, is filled with millions of people watching even the most mundane and odd videos of other people doing every day or innocuous tasks including dancing, ordering food, opening random boxes to reveal what is inside, opening and playing with toys, power washing. On other social media platforms such as Instagram and Reddit, users are able to "vote" for certain items or upvote certain ideas. There is a need for a system that enables users to expand voyeurism to interaction. In a world where anyone can become a star and anyone can watch someone do or say anything via social media platforms, there are not existing systems that allow for real-time decision-making power and immersive control to viewers of live video streaming users.

In particular, currently no platforms are engaging in live streaming with live voting and user incentivization for engagement. Some technology platforms provide live streaming functionality, however, none currently support live streaming with a live voting system.

SUMMARY OF THE INVENTION

The present invention provides a method and system for hosting a live multicast session. According to one embodiment, the system comprises a processor and a memory having executable instructions stored thereon that when executed by the processor cause the processor to establish a live multicast session initiated by a multicasting user of a multicasting client device wherein the live multicast session transmits a live media stream to viewer client devices of viewer users. The processor is further configured to receive an indication of a voting event from the multicasting user during the live multicast session, generate choices based on input from the multicasting user, present the choices to the viewer client devices, receive votes on the choices from the viewer client devices, calculate a result of the votes, and reward the viewer users based on the result of the votes.

The viewer client devices may be allowed to share, comment, chat, and participate in the live multicast session. The processor may be further configured to initiate the live multicast session via a social networking server. The processor may be further configured to generate an interface for entering details to establish the live video multicast session, the interface including a title field and a privacy field. The processor may be further configured to generate a live multicast interface including a response field displaying response information associated with one or more of the viewer client devices of viewer users.

The live multicast session may be associated with a live/instant voting and points system to incentivize user engagement from viewer client devices. Points and/or money may be awarded to the multicasting user for receiving votes or participation based on certain lengths of time or a pass/fail decision. Points may contribute to the multicasting user's popularity and placement on a landing page. The processor may be further configured to create choices that dictate an action taken by the multicasting user during the live media stream.

The input may include voting items corresponding to the choices and a voting period. The choices may be voted on by the viewer users within the voting period. An amount of votes may correspond to an amount of points awarded to the multicasting user. Points may be awarded to the multicasting user based on action performed by the multicasting user in accordance with the votes. Points may be lost by the multicasting user based on actions not performed in accordance with the votes.

According to one embodiment, the method comprises establishing a live multicast session initiated by a multicasting user of a multicasting client device wherein the live multicast session transmits a live media stream to viewer client devices of viewer users. The method further comprises receiving an indication of a voting event from the multicasting user during the live multicast session, generating choices based on input from the multicasting user, presenting the choices to the viewer client devices, receiving votes on the choices from the viewer client devices, calculating a result of the votes, and rewarding the viewer users based on the result of the votes.

Choices may be created that dictate an action taken by the multicasting user during the live media stream. The input may include voting items corresponding to the choices and a voting period. An amount of votes may correspond to an amount of points awarded to the multicasting user. Points may be awarded to the multicasting user based on action performed by the multicasting user in accordance with the votes. Points may be lost by the multicasting user based on actions not performed in accordance with the votes.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The presently disclosed system may implement a live-multicast service allowing a user to transmit a media stream over the Internet to one or more other users. The live-multicast service may distribute the media stream in a live-multicast session that allows one or more viewing users to react to the media stream and communicate with the multicasting user in real time. This may create, for the viewing users, a sense of presence at a "scene" associated with the live multicast session or a feeling of being at the same time and place as the multicasting user. According to one embodiment, the presently disclosed system may allow users get to decide what a "star" (user who is posting a video stream) will do next in order for the star to stay "popular." Streaming users of the disclosed system may allow viewing users to make decisions for them as they live stream moments, events or days blurring the lines between social media, gaming and television (e.g., part Truman Show, part video game, and part Instagram—all-in-one.

Figure 1:
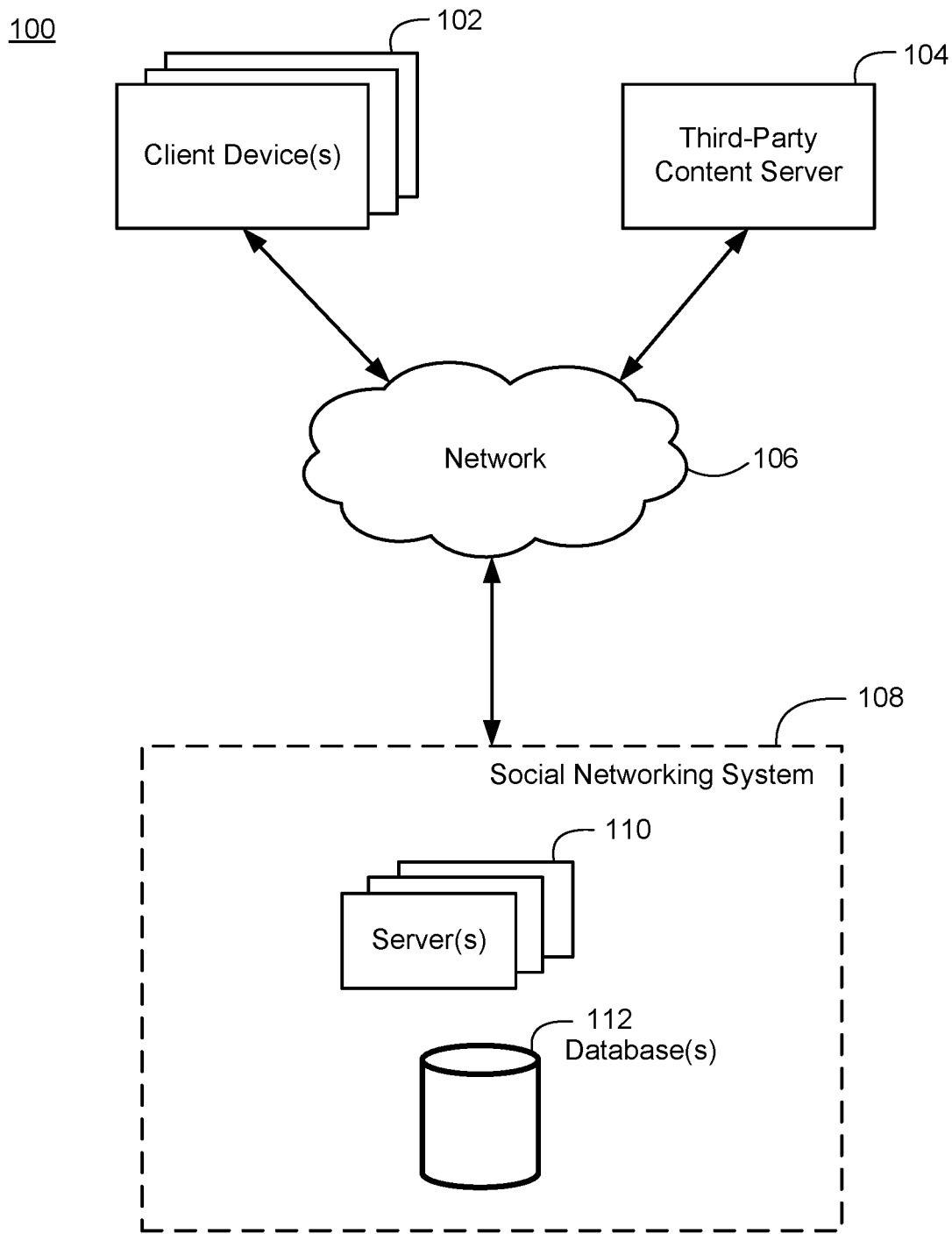
FIG. 1 illustrates a computing system according to an embodiment of the present invention.

FIG. 1 illustrates an exemplary computing system according to an embodiment of the present invention. Computing system 100 includes client device(s) 102, third-party content server 104, and a social networking system 108 that are communicatively connected to each other by a network 106. Client device(s) 102 may comprise a computing device (e.g., desktop computer, television device, terminal, laptop, personal digital assistant (PDA), cellular phone, smartphone, tablet computer, e-book reader, smart watch and smart wearable devices, or any computing device having a central processing unit and memory unit capable of connecting to a network). The client device(s) 102 may also comprise a graphical user interface (GUI) or a browser application provided on a display (e.g., monitor screen, LCD or LED display, projector, etc.). According to one embodiment, client device(s) 102 may comprise a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display. Client device(s) 102 may also include or execute an application to communicate content, such as, for example, textual content, multimedia content, or the like. The client device(s) 102 may also include or execute an application to perform a variety of possible tasks, such as browsing, searching, playing various forms of content, including locally stored or streamed video, or games. Client device(s) 102 may include or execute a variety of operating systems, including a personal computer operating system, such as a Windows, Mac OS or Linux, or a mobile operating system, such as iOS, Android, or Windows Phone, or the like.

The client device(s) 102 may include or may execute a variety of possible applications, such as a client software application enabling communication with other devices, such as communicating one or more messages, such as via email, short message service (SMS), multimedia message service (MMS), or messages on social network platforms including, for example, Facebook, LinkedIn, Twitter, Pinterest, Snapchat, or Instagram, to provide only a few possible examples. The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Network 106 may be any suitable type of network allowing transport of data communications across thereof. The network 106 may couple devices so that communications may be exchanged, such as between servers and client devices or other types of devices, including between wireless devices coupled via a wireless network, for example. Network 106 may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client device(s) 102, third-party content server 104, and social networking system 108 may be encrypted using, for example, the Advanced Encryption Standard (AES) with a 128, 192, or 256-bit key size, or any other encryption standard known in the art.

Social networking system 108 may comprise a computing system that can host an online social network. That is, social networking system 108 may generate, store, receive, and send social networking data, such as, user-profile data, social-graph information, or other suitable data related to the online social network. Social networking system 108 may be accessed by the other components of computing system 100 either directly or via network 106. Client device(s) 102 may access social networking system 108 using a web browser or a native application associated with social networking system 108 (e.g., a mobile social networking application, a messaging application, another suitable application, or any combination thereof) either directly or via network 106.

Social networking system 108 may include one or more server(s) 110. Server(s) 110 may be a unitary server or a distributed server spanning multiple computers or multiple datacenters. The server(s) 110 may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory for storing instructions or applications for the performance of various functions and a corresponding processor for executing stored instructions or applications. Server(s) 110 may be of various types, such as web server, news server, mail server, message server, advertising server, file server, application server, exchange server, database server, proxy server, or any other server suitable for performing functions or processes described herein, or any combination thereof.

Social networking system 108 may include one or more database(s) 112. Database(s) 112 may comprise storage devices that may be used to store various types of information. The information may be organized according to specific data structures. Client device(s) 102, third-party content server 104, or social networking system 108 may manage, retrieve, modify, add, or delete, the information stored in database(s) 110.

Database(s) 112 may include one or more user-profile stores for storing user profiles. A user profile may include, for example, biographic information, demographic information, behavioral information, social information, or other types of descriptive information, such as work experience, educational history, hobbies or preferences, interests, affinities, or location. The database(s) 112 may further include a connection store that may be used for storing connection information about users. The connection information may indicate users who have similar or common work experience, group memberships, hobbies, educational history, or are in any way related or share common attributes.

The social networking system 108 may also store one or more social graphs in one or more of the database(s) 112. A social graph may include multiple nodes—which may include multiple user nodes (each corresponding to a particular user) and multiple edges connecting the nodes. Social networking system 108 may provide an online social network where users may communicate and interact with other users. Users may join the online social network via social networking system 108 and add connections (e.g., relationships) to a number of other users of social networking system 108 to whom they want to be connected.

Social networking system 108 may enable users to interact with each other as well as receive content from third-party systems or other entities, or to allow users to interact with these entities through an application programming interfaces (API) or other communication channels. According to one embodiment, third-party content server 104 may include one or more types of servers, one or more data stores, one or more interfaces, including but not limited to APIs, one or more web services, one or more content sources, one or more networks, or any other suitable components, e.g., that server(s) 110 may communicate with. Social networking system 108 and third-party content server 104 may operate in conjunction with each other to provide social networking services to users of social networking system 108.

A third-party content server 104 may comprise a third-party content object provider. A third-party content object provider may include one or more sources of content objects, which may be communicated to client device(s) 102 through social networking system 108. For example, content objects may include information regarding things or activities of interest to the user, such as, for example, movie show times, movie reviews, restaurant reviews, restaurant menus, product information and reviews, advertisements, or other suitable information. As another example, content objects may include incentive content objects, such as coupons, discount tickets, gift certificates, or other suitable incentive objects.

Social networking system 108 also includes user-generated content objects, which may enhance a user's interactions with social networking system 108. User-generated content may include any data a user can add, upload, send, or "post" to social networking system 108. For example, a user may communicate posts to social networking system 108 from a client device(s) 102. Posts may include data such as status updates or other textual data, location information, photos, videos, links, music or other similar data or media. Content may also be added to social networking system 108 by third-party content server 104 through an interface, such as a feed or stream.

According to one embodiment, client device(s) 102 may create live multicast sessions via the social networking system 108. The live multicast session may allow the client device associated with a multicasting user to capture and multicast a live media stream to other users of a social networking platform provided by social networking system 108. The live media stream may comprise, for example, audio data, video data, other suitable data, or any combination thereof. Users viewing the live media stream may share, comment, chat, and participate in the live multicast session as further described herein.

Figure 2:
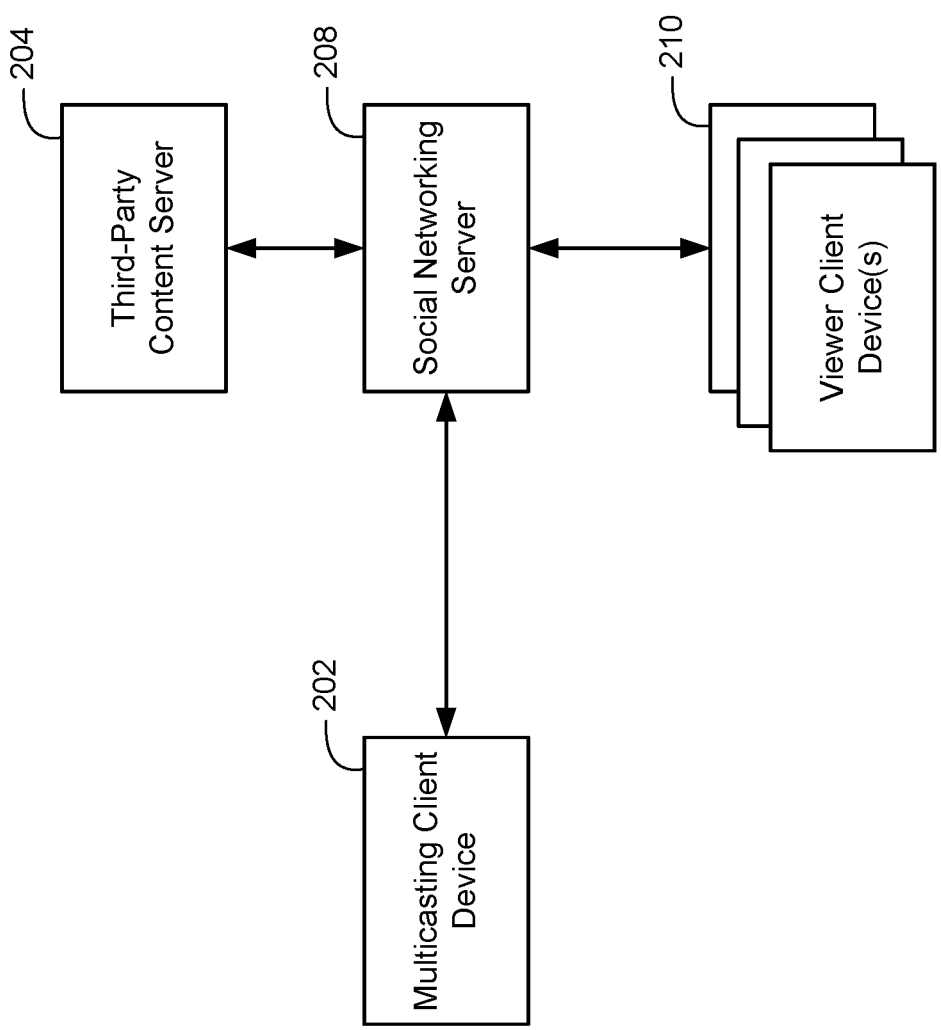
FIG. 2 illustrates flow diagram according to an embodiment of the present invention.

FIG. 2 illustrates a flow diagram according to an embodiment of the present invention. Social networking server 208 may create a live multicast session that allows a streaming user of multicasting client device 202 to multicast a live media stream to one or more viewer client device(s) 210. The multicasting client device 202 may be connected to a social networking server 208 via one or more network connections. Multicasting client device 202 associated with the multicasting user may send information to the social networking server 208 to initiate a live multicast session. For example, the information may include a specification as to a format (e.g., video, audio) of the live multicast session. The multicasting client device 202 may further provide for display an interface for entering details of the live video multicast. The interface may comprise a title field, in which the user may input a title for the live multicast session, and a privacy field which may be modified by the user to set privacy settings for the live-multicast session (e.g., public, friends only). In response to a start signal received from the multicasting client device 202, the social networking server 208 may initiate a live multicast session based on the information data in the fields.

The multicasting client device 202 may capture an incoming media stream in association with the live multicast session and generate an outgoing media stream based on the incoming media stream. The social networking server 208 may then multicast or provide a notification about the live multicast session to viewer client device(s) 210 and transmit the media stream to any viewer client device(s) 210 who request to receive the media stream.

A live multicast interface may be presented to the viewer client device(s) including the media stream. The interface may include an indicator that the media stream is a live multicast, a timer indicating a length of time of the live multicast session, and a count indicating a number of users viewing the live multicast. The live multicast interface may further comprise a response field displaying response information associated with one or more other users viewing the live multicast. The response field may display, for example, one or more text strings, one or more emoticons, one or more other information objects inputted by one or more viewing users, or any combination thereof.

Social networking server 208 may provide user engagement functionality. The user engagement functionality may include a live/instant voting and points system to incentivize user engagement with live multicast sessions. Text/push notifications may be generated by social networking server 208 to alert followers of a multicasting user about a vote. The multicasting user may outline which choices are upcoming for the day or event for the viewing users. Points and/or money may be awarded to a multicasting user for receiving votes or participation based on certain lengths of time (2-hour points, 12-hour points) or could be based on a pass/fail decision. Points may add to a user's "likes" and/or popularity which may be directly tied to the multicasting user's popularity and where they placed on a landing page in order to get more views. The points and/or money system can also be used to incentivize the voters (users of viewer client device(s) 210) of the platform to continue engaging with the user of the multicasting client device 202. Additional functionality that social networking server 208 may provide include user chat options, viewer party options, influencer partnership options, combined voter options, a built-in sponsorship system (e.g., in conjunction with third-party content server 204), and a live campaigns vs. old campaigns library.

Figure 3:
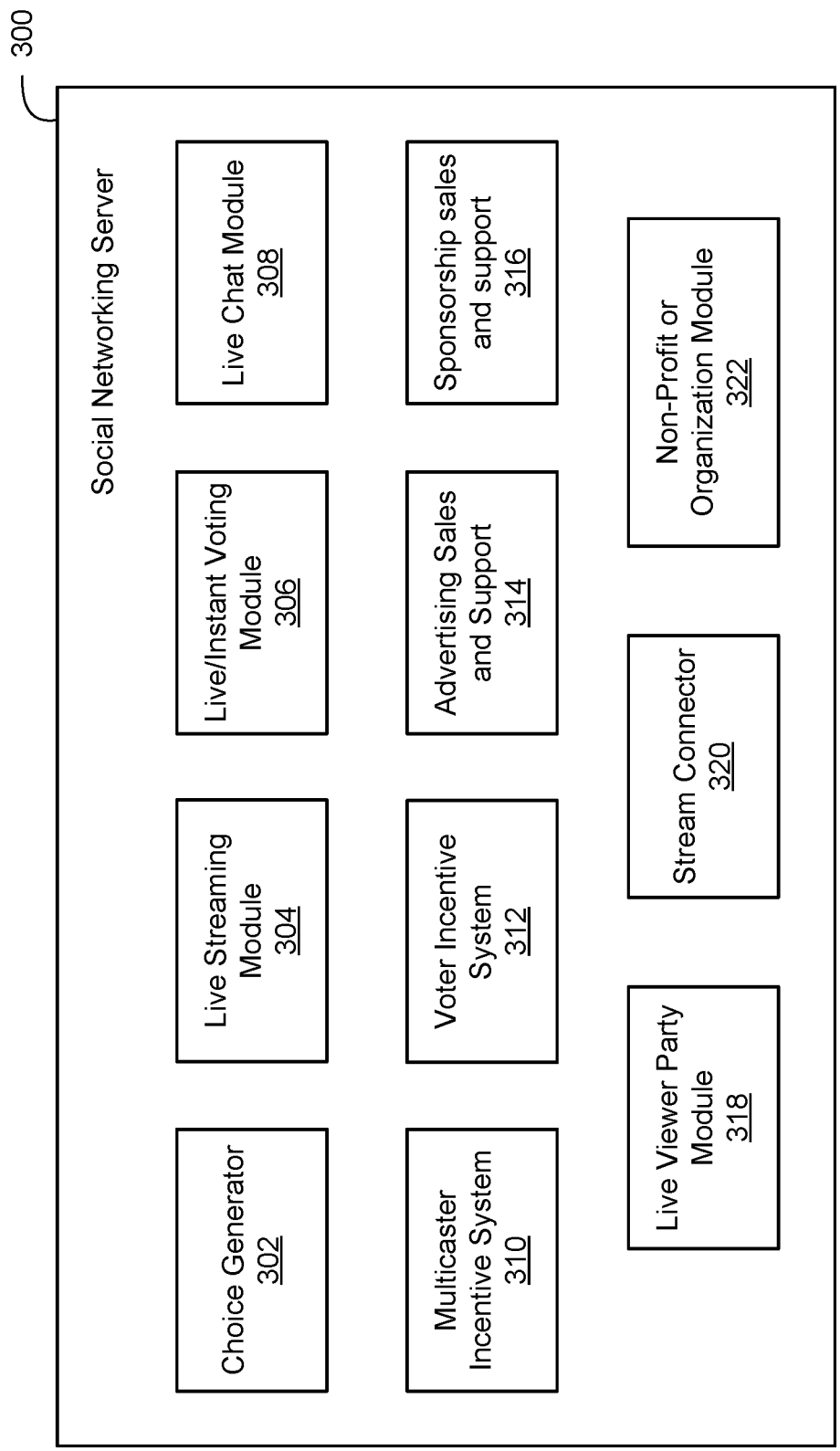
FIG. 3 illustrates a block diagram of a social networking server according to an embodiment of the present embodiment.

FIG. 3 presents a block diagram of a social networking server according to an embodiment of the present embodiment. The presently disclosed system may include a social networking server 300 configurable to allow creating live multicast sessions via a live streaming module 304. During a live multicast session, a multicasting user may initiate choice generator 302 to generate choices to supplement a live media stream. Choice generator 302 may be configured to create "choices" that dictate an action taken by a multicasting user during the live media stream. The multicasting user may input voting items and corresponding choices along with a voting period and "log" them with the social networking server.

The choices may be voted on by viewers of the live media stream within a given time period. The more votes that are received, the more points the multicasting user receives or is awarded (e.g., similar to how many "likes" something gets). Additionally, points are awarded to the multicasting user as the user performs more actions in accordance with the votes. However, if the multicasting user does not follow through in accordance with the votes, points may be lost/lowered and may cause the multicasting user to move lower in standings or popularity. As a multicasting user continues to gain points and rise in the "standings," they may be awarded items or awards that can be converted into "non-fungible tokens" ("NFTs"), such as a championship cup image, or a "fastest fingers" award. Various NFTs may be generated by the social networking server 300 for trading and purchasing. A NFT may comprise a unique, one-of-a-kind digital item stored on a digital ledger (e.g., blockchain) which provides public proof of ownership. NFTs can be associated with items such as photos, videos, audio, and other types of digital files as unique items.

Live/instant voting module 306 may receive the choices from choice generator 302 corresponding to the live media stream for distribution to viewers for voting responses. The votes may be submitted by clicking or entering an emoticon or pressing a button to indicate a vote. For example, Jamie asks her followers to vote on all decisions for the next 10 hours. She may put up for vote the option of wearing either a red dress or a blue dress. The followers may vote for the red dress and she wears the red dress (and indicates so to the social networking server)—points may then be awarded to her. Jamie then offers up a vote for the hot pepper for lunch or the salad. The followers vote the hot pepper, but she chooses not to follow through. As a result, she loses the potential points she would have gotten if she had instead completed the full timeline/choices for those 10 hours.

Multicaster incentive system 310 may comprise a system of points, money, or tokens for ranking multicasting users within the platform provided by social networking server 300. Similarly, voter incentive system 312 may comprise a system of points, money, or tokens for ranking voters and/or users within the platform. Advertising Sales and support 314 may be configured to interface with third-party content servers for purchasing and placing advertisements. Sponsorship sales and support 316 may be configured for connecting third-party content servers (e.g., advertisers) to the multicasting users as well as voters and users on the platform. Live chat module 308 may facilitate messaging within the social networking platform between viewing users and multicasters. Live viewer party module 318 may allow users to create viewing parties including a plurality viewing users that are able to chat or communicate with each other. Stream connector 320 may allow two (or more) live video stream users to connect their video streaming sessions and their voters into one "proxy" vote. Non-profit or organization module 322 may allow a conversion of vote to actual currency donations to non-profit or organization (e.g., "donate $10 to Org X if you vote now").

Figure 4:
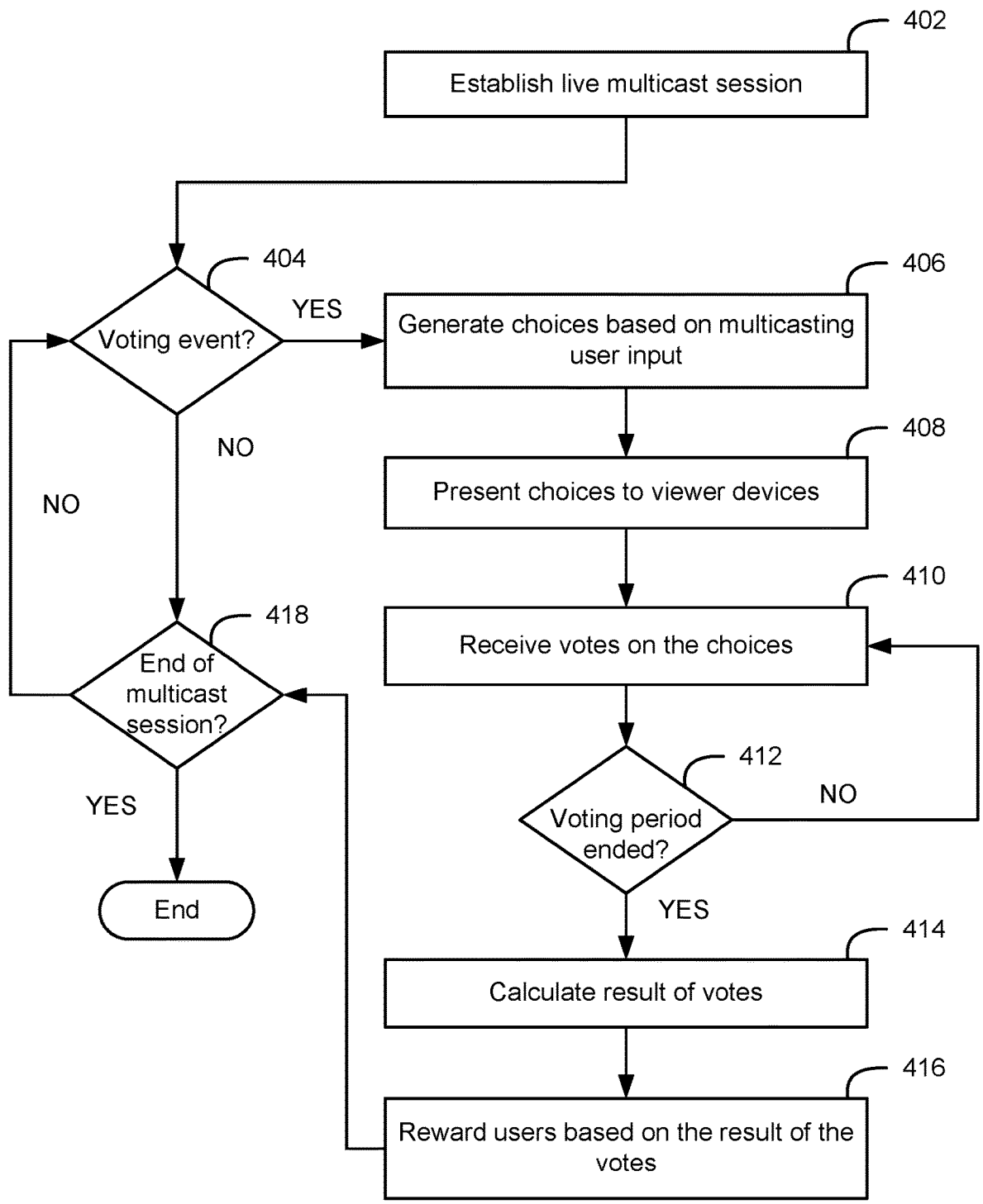
FIG. 4 illustrates a flowchart of a method for hosting a live multicast session according to an embodiment of the present invention.

FIG. 4 presents a flowchart of a method for hosting a live multicast session that allows viewers to participate in decision making events created by a streamer of the live multicast session. A live multicast session is established, step 402. Establishing the live multicast session may include receiving a live media stream from a multicasting client device of a multicasting user by a social networking system. The social networking system may then distribute or multicast the live media stream to client devices of viewer users that are logged onto the social networking system. The viewer users may subscribe their devices to or "follow" the multicasting user of the live media stream such that they may be notified of the availability of the live media stream. The availability of the live media stream may also be provided on a "trending" list or "home page" of a website.

A voting event is monitored for the duration of the live multicast session, step 404. The multicasting user may indicate a voting event at any point in the live multicast session. Upon the voting event, choices are generated based on input from the multicasting user, step 406. During the live multicast session, the multicasting user may solicit from viewer users an action or decision the multicasting user should make on regarding a given situation or circumstance. The multicasting user may enter input to an interface of the social networking system to provide the viewer users with choices for voting on the action or decision.

The choices are presented to the viewer devices, step 408. The choices may be available for selection by the viewer users on a corresponding interface of the social networking system for a limited period of time. Votes on the choices are received from the viewer devices, step 410. In one embodiment, the multicasting user and/or the viewer users may not be shown the results of the voting until the end of a voting period. The votes are received until the end of the voting period, step 412. Upon the end of the voting period, a result of the votes are calculated, step 414. The result of the votes may be revealed to all users. For example, the choice with the highest number of votes is presented to the multicasting user and the viewer users. The result of the vote may then influence the multicasting user to perform a certain activity or decision during the live multicast session.

The viewer users of the viewer devices are rewarded based on the result of the votes, step 416. For example, viewer users who voted on the winning choice (most voted on) may be awarded with points, money, or tokens on the social networking system. A standard reward amount may be predefined by the social networking system. The multicasting user may also be awarded points or popularity based on the number of votes or amount of participation by the viewer users during the multicast session. Multicasting users with a combination of the most views, votes, and how often they score points, may be awarded with and provided with a more prominent position to be viewed more. The social networking system may proceed to monitor for the end of the multicast session, step 418.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for hosting a live multicast session, the system comprising:
 a processor; and
 a memory having executable instructions stored thereon that when executed by the processor cause the processor to:
 establish a live multicast session initiated by a multicasting user of a multicasting client device, the live multicast session transmitting a live media stream to viewer client devices of viewer users;

receive an indication of a voting event from the multicasting user during the live multicast session;

generate choices based on input from the multicasting user, wherein the choices dictate an action taken by the multicasting user during the live multicast session;

present the choices to the viewer client devices;

receive votes on the choices from the viewer client devices;

calculate a result of the votes;

reward the viewer users based on the result of the votes, wherein the viewer users who voted on a winning choice are rewarded;

reward the multicasting user based on a pass decision for action performed in accordance with the votes; and penalize the multicasting user based on a fail decision for action not performed in accordance with the votes.

2. The system of claim 1 wherein the viewer client devices are allowed to share, comment, chat, and participate in the live multicast session.

3. The system of claim 1 wherein the processor is further configured to initiate the live multicast session via a social networking server.

4. The system of claim 1 wherein the processor is further configured to generate an interface for entering details to establish the live video multicast session, the interface including a title field and a privacy field.

5. The system of claim 1 wherein the processor is further configured to generate a live multicast interface including a response field displaying response information associated with one or more of the viewer client devices of viewer users.

6. The system of claim 1 wherein the live multicast session is associated with a live/instant voting and points system to incentivize user engagement from viewer client devices.

7. The system of claim 6 wherein points and/or money are awarded to the multicasting user for receiving votes or participation based on certain lengths of time.

8. The system of claim 6 wherein points contribute to the multicasting user's popularity and placement on a landing page.

9. The system of claim 1 wherein the input includes voting items corresponding to the choices and a voting period.

10. The system of claim 9 wherein the choices are voted on by the viewer users within the voting period.

11. The system of claim 1 wherein an amount of votes corresponds to an amount of points awarded to the multicasting user.

12. The system of claim 1 wherein points are awarded to the multicasting user based on action performed by the multicasting user in accordance with the votes.

13. The system of claim 1 wherein points are lost by the multicasting user based on actions not performed in accordance with the votes.

14. The system of claim 1 wherein the multicasting user is rewarded with items or awards that can be converted into non-fungible tokens (NFTs).

15. The system of claim 1 wherein multiple voting events occur during the live multicast session over a given length of time and wherein the processor:

rewards the multicasting user based on a pass decision for action performed in accordance with the votes for each of the multiple voting events; and penalizes the multicasting user based on a fail decision for action not performed in accordance with the votes for each of the multiple voting events.

16. A method, in a data processing system comprising a processor and a memory, for hosting a live multicast session, the method comprising:

establishing, by a computing device, a live multicast session initiated by a multicasting user of a multicasting client device, the live multicast session transmitting a live media stream to viewer client devices of viewer users;

receiving, by the computing device, an indication of a voting event from the multicasting user during the live multicast session;

generating, by the computing device, choices based on input from the multicasting user, wherein the choices dictate an action taken by the multicasting user during the live multicast session;

presenting, by the computing device, the choices to the viewer client devices;

receiving, by the computing device, votes on the choices from the viewer client devices;

calculating, by the computing device, a result of the votes;

rewarding, by the computing device, the viewer users based on the result of the votes, wherein the viewer users who voted on a winning choice are rewarded;

rewarding, by the computing device, the multicasting user based on a pass decision for action performed in accordance with the votes; and penalizing the multicasting user based on a fail decision for action not performed in accordance with the votes.

17. The method of claim 16 wherein the input includes voting items corresponding to the choices and a voting period.

18. The method of claim 16 wherein an amount of votes corresponds to an amount of points awarded to the multicasting user.

19. The method of claim 16 wherein points are awarded to the multicasting user based on action performed by the multicasting user in accordance with the votes.

20. The method of claim 16 wherein points are lost by the multicasting user based on actions not performed in accordance with the votes.

21. The method of claim 16 further comprising receiving, by the computing device, shares, comments, chats, and participation in the live multicast session by the viewer client devices.

22. The method of claim 16 further comprising initiating, by the computing device, the live multicast session via a social networking server.

23. The method of claim 16 wherein rewarding the multicasting user based on a pass decision for action performed in accordance with the votes comprises rewarding the multicasting user with items or awards that can be converted into non-fungible tokens (NFTs) based on a pass decision for action performed in accordance with the votes.

24. The method of claim 16 wherein receiving an indication of a voting event from the multicasting user during the live multicast session comprises receiving indications of multiple voting events from the multicasting user during the live multicast session over a given length of time, and the method further comprising:

rewarding the multicasting user based on a pass decision for action performed in accordance with the votes for each of the multiple voting events; and penalizing the multicasting user based on a fail decision for action not performed in accordance with the votes for each of the multiple voting events.

* * * * *